(12) United States Patent
Schwaller et al.

(10) Patent No.: US 6,230,026 B1
(45) Date of Patent: May 8, 2001

(54) BASESTATION ARCHITECTURE SUPPORTING BASEBAND FREQUENCY HOPPING UTILIZING TIME DIVISION MULTIPLEXED MAPPING BETWEEN A RADIO TRANSCEIVER AND DIGITAL SIGNAL PROCESSING RESOURCES

(75) Inventors: John F. Schwaller; Jeffrey Wilson Smith, both of Palm Bay; Terry L. Williams, Melbourne Beach, all of FL (US)

(73) Assignee: Airnet Communications Corporation, Melbourne, FL (US)

( * ) Notice: Subject to any disclaimer, the term of this patent is extended or adjusted under 35 U.S.C. 154(b) by 0 days.

(21) Appl. No.: 09/418,629

(22) Filed: Oct. 15, 1999

Related U.S. Application Data

(60) Provisional application No. 60/104,433, filed on Oct. 15, 1998.

(51) Int. Cl.[7] ................................................. H04M 1/00
(52) U.S. Cl. ........................ 455/561; 455/450; 455/509; 370/337; 370/347; 370/362; 375/132; 375/135; 375/136; 375/138
(58) Field of Search ...................................... 455/450, 451, 455/507, 509, 561; 375/132–137, 138; 370/337, 347, 362

(56) References Cited

U.S. PATENT DOCUMENTS

| | | | |
|---|---|---|---|
| 5,430,713 | * | 7/1995 | Gupta et al. ............................ 370/50 |
| 5,592,480 | * | 1/1997 | Carney et al. ........................ 370/347 |
| 5,940,384 | | 8/1999 | Carney et al. ........................ 370/347 |

* cited by examiner

Primary Examiner—Lee Nguyen
(74) Attorney, Agent, or Firm—Akerman Senterfitt

(57) ABSTRACT

A wireless telephone architecture employs a broadband transceiver that is coupled to a digital channelizer and digital combiner, such as may employ a real-time Fast Fourier Transform, to extract or combine a set of simultaneous baseband signals. The baseband signals which represent physical channels are mapped to a bank of digital signal processors representing logical channels according to a mapping instituted at the initialization of the call. The mapping is changed on a periodic basis to follow a predetermined frequency hopping schedule. Frequency hopping is thus enabled in a statically tuned broadband transceiver.

14 Claims, 11 Drawing Sheets

BASESTATION ARCHITECTURE SUPPORTING BASEBAND FREQUENCY HOPPING UTILIZING TIME DIVISION MULTIPLEXED MAPPING BETWEEN A RADIO TRANSCEIVER AND DIGITAL SIGNAL PROCESSING RESOURCES

CROSS-REFERENCE TO RELATED APPLICATIONS

This application claim benefit to Provisional Application 60/104,473 filed Oct. 15, 1998.

FIELD OF THE INVENTION

The present invention relates in general to wireless communication networks (e.g. cellular and personal communication systems) and is particularly directed to an architecture used to support frequency hopping associated therewith.

BACKGROUND OF THE INVENTION

The basestations used by the providers of current day multiple channel wireless communication services, such as cellular mobile telephone (CMT) and personal communication systems (PCS), typically designate signal processing equipment for each single receiver channel. This is probably a result of the fact that each basestation is configured to provide communication capability for only a limited predetermined number of channels in the overall frequency spectrum that is available to the service provider.

A typical basestation may thus contain several racks of equipment which house multiple sets of receiver and transmitter signal processing components that service a prescribed subset of the available channels. For example, in an IS-136 TDMA cellular system, a typical basestation may service a pre-selected number of RF channels, such as 12, simultaneously supporting a total number of 36 mobile units, of the total number, such as 416, of the RF channels available to the service provider.

Wireless service providers would prefer, however, to employ equipment that would be more flexible, both in terms of where it can be located, as well as in the extent of the available bandwidth coverage provided by a particular transceiver site. This is particularly true where relatively large, secure, and protective structures for multiple racks of equipment are not necessarily available or cost effective. Additionally, service providers desire equipment that can accommodate subscriber growth with features making more efficient use of the available RF spectrum, such as for PCS applications.

One way to resolve this difficulty is to implement a basestation transceiver using a high speed analog-to-digital (A/D) converter and equipment which makes use of efficient digital filtering algorithms such as the Fast Fourier Transform (FFT) to separate the incoming signal energy into multiple baseband channels. On the transmit side, this implementation includes an inverse FFT processing combiner which outputs a combined signal representative of the contents of the baseband signal provided to it.

U.S. Pat. No. 5,940,384 assigned to the same assignee as the present invention and hereby incorporated by reference describes a method of flexibly allocating modulators and demodulators (in the form of digital signal processors or DSPs) to ones of these baseband channels as additional resources are needed, for example, during times of high message traffic. By making the basestation's implementation of call processing resources modular, the basestation can initially be configured to support a limited number of channels. Then, as the demand for services grows, additional channels can be supported by the addition of additional DSPs. The DSPs allow a change or expansion in the type of service, for example, into one of several air interface standards such as code division multiple access (CDMA) as well as time division multiple access (TDMA).

To ensure non-interfering coverage among dispersed basestations, each basestation uses only a subset of the available RF channels, so that mutual interference among any of the channels of the network is reduced. To further reduce interference, frequency hopping can be used. Frequency hopping can significantly reduce the average interference on a given RF channel compared to statically tuned channels. With reduced interference, higher frequency reuse is possible allowing more efficient use of the available RF spectrum, thus enabling higher capacity within the network.

SUMMARY OF THE INVENTION

The present invention provides a method of performing frequency hopping with a wideband transceiver configured in a modular manner, by periodically changing the mapping between DSPs and their associated channels to comply with a frequency hopping schedule. The ability to freely allocate DSPs among channels, used to provide flexibility in handling changing traffic loads and the like, as will be described, is thus harnessed to provide frequency hopping modifications.

Specifically, frequency hopping reduces co-channel interference for each call by switching the frequency on which a particular traffic channel is transmitted. Thus, frequency hopping reduces the probability of RF interference events between co-channels. This allows improved call quality with more overall system capacity via higher frequency reuse. To further clarify, frequency hopping varies the frequency used at predetermined intervals and uses different hop sequences that are non-correlated between basestations using a subset of the same frequencies. Accordingly, the present invention supports frequency hopping utilizing real-time switching RF carriers over a time division multiplexed (TDM) bus between RF transceiver resources and digital signal processing resources.

The RF transceiver resource converts received RF carriers to a baseband signal. Likewise, it converts signals to be transmitted from a baseband representation to the proper RF frequency. An implementation of this invention utilizes dual port (DP) random access memories (RAM) that are used to map a baseband signal to a logical digital signal processor (DSP) resource that produces that signal. A microprocessor possessing the frequency hop sequence of the baseband signal is used to update the DP memory as the RF carrier's frequency changes. The RF carrier is mapped from the RF frequency that the carrier is using in real-time to the same DSP resource for processing.

To support frequency hopping, as provided in GSM for example, the architecture of the present invention also allows determination of changes in the frequency and the ability to effect those changes in synchronization with a mobile unit. To effect these changes, the invention divides the DP-RAM into two sections. One section contains the current frequency set of all RF channels, and the other section contains the next frequency set in the hop sequence. This ping/pong structure of the DP-RAM allows a digital signal processor to swap the sections of the DP-RAM at predetermined intervals that are used to map RF channels to the TDM bus. The same DSP has access to the DP-RAM and fills the inactive section of the DP-RAM with the frequency information for the next frequency hop. Therefore, all swapping or ping/pongs of the DP-RAM occur at the frequency hop (FHOP) rate. Furthermore, the ping/pongs of the DP-RAM invoked by a DSP must be synchronized with other DSPs performing baseband processing of the RF channels as the FHOP rate is determined by the framing structure of the GSM TDMA RF (radio frequency) signal. One scheme used to achieve this synchronization is to align the GSM framing time of the DSP controlling the DP-RAM with baseband processing DSPs using a common TDMA frame signal generated by digital clocking logic and driven by an accurate timing source such as a global positioning system (GPS) receiver. All DSPs monitor this TDMA framing signal in the frequency hop mode, and via this architecture, frequency hopping is supported for the broadband basestation.

In accordance with the present invention then, the co-channel interference associated with signal processing architectures currently employed by multichannel wireless communication service providers is reduced by this new and improved broadband architecture and methodology that supports frequency hopping.

The foregoing and other objects and advantages of the invention will appear from the following description. In the description, reference is made to the accompanying drawings, which form a part hereof, and in which there is shown by way of illustration a preferred embodiment of the invention. Such embodiment does not necessarily represent the full scope of the invention, however, and reference must be made to the claims herein for interpreting the scope of the invention.

DETAILED DESCRIPTION OF A PREFERRED EMBODIMENT

Figure 1:
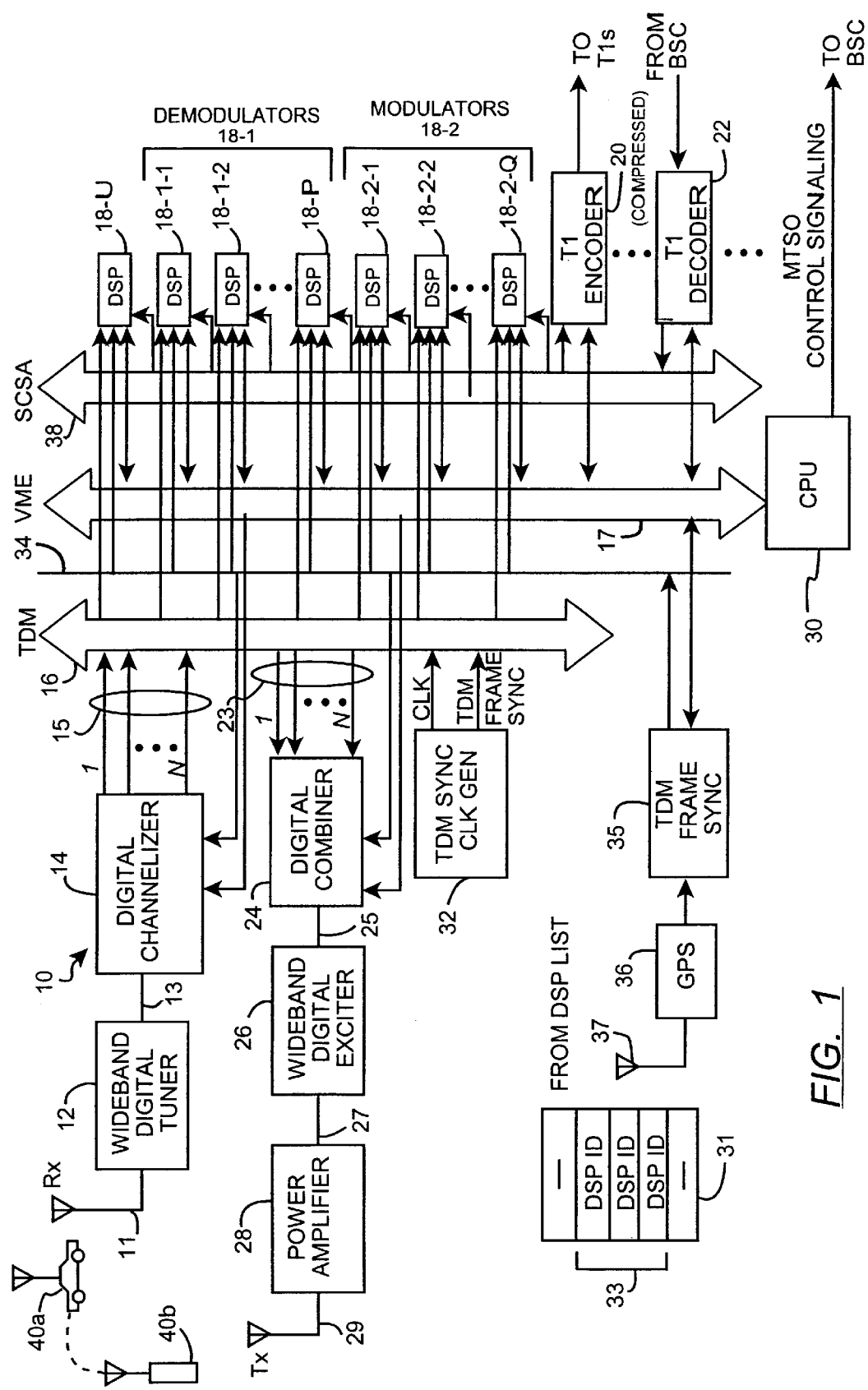
FIG. 1 is a block diagram of a wideband digital basestation making use of a time division multiplex (TDM) bus according to the invention.

FIG. 1 is a block diagram of a wideband wireless digital basestation 10 according to the invention. Briefly, the basestation 10 consists of a receive antenna 11, one or more wideband digital tuners 12, one or more digital channelizers 14, a time division multiplex (TDM) bus 16, a control bus 17, a plurality of digital signal processors (DSPs), a first subset of which are programmed to operate as demodulators 18-1-1, 18-1-2, . . . , 18-1-P (collectively, demodulators 18-1); a second subset of which are programmed to operate as modulators 18-2-1, 18-2-2, . . . , 18-2-Q (collectively, modulators 18-2); and a third subset 18-U of which are presently idle, transport signal (T-1) encoder 20, a T-1 decoder 22, one or more digital combiners 24, one or more wideband digital exciters 26, a power amplifier 28, a transmit antenna 29, a basestation control processing unit (CPU) 30, a TDM bus synchronization clock generator 32, a signal computing system architecture (SCSA) bus 38, a TDMA frame sync clock generator 35, a TDMA frame sync clock signal 34, a global positioning system (GPS) receiver 36, and a GPS antenna 37.

More particularly, the basestation 10 exchanges radio frequency (RF) signals with a number of mobile subscriber terminals (mobiles) 40a, 40b. The RF carrier signals are modulated with voice and/or data (channel) signals which are to be coupled to the public switched telephone network (PSTN) by the basestation 10. The particular modulation in use may be any one of a number of different wireless (air interface) standards such as the well known Advanced Mobile Phone Service (AMPS), time division multiple access (TDMA) such as IS-136, code division multiple access (CDMA) such as IS-95, frequency hopping standards such as the European GSM, personal communication network (PCN) standards, and the like. Indeed, in a manner that will be described below, the basestation 10 may even be configured to simultaneously process RF signals formatted according to more than one such air interface at the same time.

On the receive side (that is, with respect to the basestation 10), RF modulated signals are first received at the receive antenna 11, and forwarded to the wideband digital tuner 12. The digital tuner 12 downconverts the RF signal received at the antenna 11 to a intermediate frequency (IF) and then performs an analog to digital (A/D) conversion to produce a digital composite signal 13.

Digital tuner 12 is wideband in the sense that it covers a substantial portion of the bandwidth available to the wireless service provider who is operating the basestation 10. For example, if the air interface implemented by the basestation 10 is GSM, the wideband digital tuner 12 may downconvert 5 MegaHertz (MHz) bandwidth in the 1900 MHz range which contains as many as 25 receive RF channel signals, each having approximately 200 kiloHertz (kHz) bandwidth.

The digital channelizer 14 implements a channel bank to separate the downconverted composite digital signal 13 to a plurality, N, of digital channel signals 15.

This digital sampled signal is then further filtered to separate it into the individual 200 kHz channel signals in the GSM example. The digital channelizer 14 can thus be considered as a bank of analysis digital filters with each filter having a 200 kHz bandwidth. The digital channelizer 14 may implement the filter bank using any of several different filter structures, and no particular digital filter structure is critical to the operation of the invention. However, in one preferred embodiment, the digital channelizer 14 consists of a set of convolutional digital filters and a Fast Fourier Transform (FFT) processor. The convolutional digital filters make use of multirate digital filter techniques, such as overlap and add, or polyphase, to efficiently implement a digital filter bank by grouping samples of the downconverted signal together, multiplying the sample groups by a convolutional function, and then forwarding the samples to the FFT for conversion into the N individual channel signals. Such filter banks may be implemented using any of the techniques as are described in the textbook by Crochiere, R. E., and Rabiner, L. R., entitled "Multirate Digital Signal Processing" (Englewood Cliffs, N.J.: Prentice-Hall, 1983), pages 289–399.

In any event, the channelizer 14 provides N individual digital channel signals 15, wherein each of the N outputs represent information in one of the radio frequency channels originated by a number of mobiles 40 that are time multiplexed onto a signal RF channel, that number being up to 8 mobiles 40 for the GSM example.

These N digital RF channel signals are then provided over the time division multiplex (TDM) bus 16 to a plurality of digital signal processors (DSPs) 18-1-1, 18-1-2, ..., 18-1-P (collectively, demodulator-DSP 18-1). In a manner that will be understood in greater detail shortly, the TDM bus 16 operates as a time division multiplexed cross-bar switch. That is, any one of the N digital channel signals 15 may be connected to any one of the demodulator DSPs 18-1 via the TDM bus 16.

The exact nature of the timing of the TDM bus 16, that is, the number of time slots available for each frame of data samples output by the digital channelizer 14, and thus the manner in which the N digital channel signals are transferred over the TDM bus 16, changes depending upon the number of channel signals, N. The manner in which the basestation 10 accommodates these changes in the timing of the TDM bus 16 will be described in greater detail below.

The DSPs 18-1 are each programmed to remove the modulation on each channel signal 15 as specified by the air interface standard supported by the basestation 10. There typically is not a one-to-one correspondence between the number of DSPs 18-1 and the number of channel signals, N, provided by the channelizer 14. For example, the DSPs may each process a number, such as 24, of digital RF channel signals 15 at the same time.

The DSPs 18 are synchronized to each other via a common TDMA frame sync clock signal 34, generated by a TDMA frame sync clock generator 35, which is used to maintain time slot alignment over TDMA air interfaces such as GSM or IS-136. Accuracy of the air interface time slot alignment can be achieved via a GPS receiver 36 receiving accurate timing information from a GPS satellite via the GPS antenna 37.

The CPU 30, using the VME bus 17 and TDM synchronization clock generator 32, manages access by individual digital RF channel signals 15 to the TDM bus 16, in a manner that will be described shortly. The VME bus 17 is a well-known industry standard relatively high frequency bus for interconnecting processors and components.

The outputs of the digital signal processors 18-1, representing demodulated audio or data signals, are then forwarded over the SCSA bus 38 to the encoder 20. The SCSA bus 17 is also a well-known industry standard developed for computer telephony applications.

The encoder 20, in turn, reformats the demodulated signals as necessary for transmission to a local Base Station Controller (BSC) in the GSM example or similarly, a Mobile Telephone Switching Office (MTSO) for other wireless standards. The demodulated signals may be reformatted according to any one of a number of well-known time multiplex telephone signal transport protocols, such as the so-called T1 (or E1) span. The T1 signals are then processed by the BSC in a known fashion, to ultimately complete a telephone call from the subscriber unit 40 to a desired destination, such as another telephone subscriber who is connected to the Public Switched Telephone Network (PSTN).

Since each T1 span has a limited capacity, there may be more than one T1 signal necessary to accommodate all of the channels serviced by the basestation 10. In the example being discussed, one T1 signal may be formatted to carry up to 92 GSM bandwidth-compressed traffic signals to the BSC allowing bandwidth on the T1 span for control messaging between the base station 10 and the BSC and assuming that the demodulated traffic signals remain as compressed audio. Additional T1 spans entirely dedicated to voice or data traffic may transport up to 96 traffic signals, each, in the GSM example. When not all of the channels are busy, however, as many of the T1 line resources as are necessary are connected to the BSC, in a manner that will be understood shortly.

In other words, the demodulated signals output by the DSPs 18-1 may each be sub-rate (e.g., sub-DS0 frequency signals) which still contain additional encoding other than the air interface standard, such as impressed by a speech compression scheme, which is not removed by the basestation 10. Rather, to minimize the required number of time slots used by the T1 signals, such compression may be removed at the BSC or other network components prior to the connection of the signal to the PSTN.

The signal flow on the transmit side of the basestation 10 is analogous. Signals are received from the BSC and provided to the T1 decoder 22, which removes the T1 formatting. The unformatted T1 signals are then coupled to the DSPs 18 over the SCSA bus 38. A subset of the DSPs 18-2-1, 18-2-2, ..., 18-2-Q (collectively, modulators 18-2) then modulate these signals and present them to the TDM bus 16. Ultimately, these are then each coupled to one of the N digital channel signals 23 input to the combiner 24. As was true in the receive direction, being a cross-bar switch, the TDM bus 16 permits any one of the modulator DSPs 18-2 to be connected to any one of the channel signal inputs 23.

Although each modulator DSP 18-2 typically processes multiple channel signals, each such channel signal generated by the modulator DSP 18-2 is typically assigned one or more unique time slots on the TDM bus 16, with no two channel signals thus occupying the same time slot. Similarly, no two channel signals on the receive side occupy the same timeslot on the TDM bus 16.

As for the demodulator DSPs 18-1, the number of time slots assigned per frame on the TDM bus 16 varies, depending upon the channel bandwidth of the modulation standard implemented.

Other DSPs 18-U may be unused at a particular point in time. However, these unused DSPs 18-U remain as an available resource to the basestation 10, should a new mobile 40 request access. The manner in which DSPs are allocated at the time of setting up a call will be described in detail below.

The digital combiner 24 combines the TDM bus 16 outputs to produce a composite IF digital signal 25 representing the N channels to be transmitted. The digital combiner 24 then feeds this combined signal to a digital exciter 26, which generates an RF signal 27. This RF signal 27 is then amplified by a power amplifier 28 and fed to a transmit antenna 29.

In order to set up each call, the CPU 30 must exchange certain control information with the BSC. For example, when a mobile unit 40 wishes to place a call, the mobile 40 indicates this by transmitting on one or more control signal channels. These control signals are exchanged and are present in one or more of the channel signals output by the channelizer 14 or input to the combiner 24.

In either event, the basestation 10 forwards the request for access by the mobile 40 to the BSC, to set up the end to end connection. Upon receiving an indication from the BSC that the connection can be made at the remote end, the basestation 10 then performs a number of steps to insure that the appropriate data path through the TDM bus 16 and SCSA bus 38 is able to support communication with between the newly enabled mobile 40 and the BSC.

For example, the BSC typically returns a pair of T1 span line and T1 time slot identifiers. These inform the CPU 30 on which outgoing T1 line and time slot to place the received signal, and on which incoming T1 line and time slot it can expect to obtain the transmit signal for the mobile 40.

Figure 2:
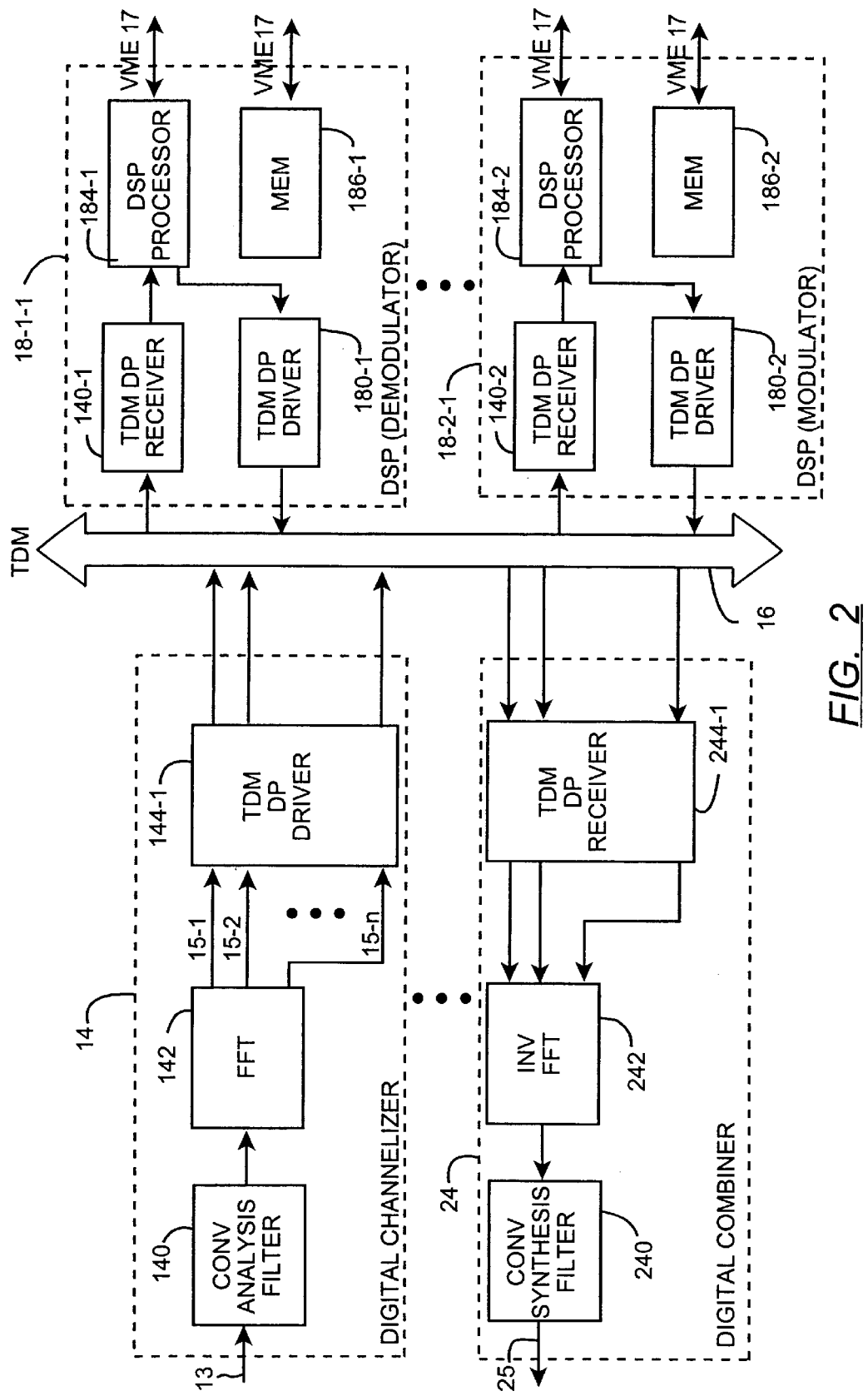
FIG. 2 is a more detailed block diagram showing addressable bus drivers and receivers which permits access to the TDM bus.

However, before proceeding with a detailed explanation of this call set-up process, a bit more detail of the operation of the TDM bus 16 will be provided. As shown in FIG. 2, the digital channelizer 14 may consist of a convolutional analysis digital filter 140, a fast Fourier transform (FFT) 142, as well as a TDM dual port (DP) driver 144.

The operation of the analysis convolutional filter 140 and FFT 142 is not critical to the present invention. It is sufficient here to say that the convolutional filter 140 and FFT 142 make use of multirate digital signal processing techniques, such as overlap and add or polyphase, to efficiently implement a digital filter bank by (1) grouping samples of the downconverted signal 13 together and multiplying them by a weighting function, and then (2) forwarding them to the FFT 142 for conversion into the N individual RF channel signals.

An exemplary DSP demodulator 18-1-1 and modulator 18-2-1 are also shown in FIG. 2. The demodulator DSP 18-1-1 includes a TDM DP driver 180-1, a TDM DP receiver 140-1, a DSP processing unit 184-1 and program memory 186-1. Similarly, the modulator DSP 18-2-1 includes a TDM DP driver 180-2, a TDM DP receiver 140-2, a DSP processing unit 184-2 and program memory 186-2.

Indeed, the modulator and demodulator DSPs may share the same hardware architecture, with the only difference being in the program which is enabled in the program memory 186, which in turn may control whether the TDM receiver 140 or TDM driver 180 hardware is enabled. Likewise, the modulator and demodulator DSPs may be the same physical device, where the programming of the DSP time shares the modulation and demodulating processing within the DSP.

Thus, in the DSP demodulator 18-1-1, only the TDM DP receiver 140-1 is enabled (as indicated by the dashed lines around the driver 180-1), since the demodulator 18-1-1 only receives data from the TDM bus 16. Likewise, only the TDM DP driver 180-2 is enabled in the DSP modulator 18-2-1, since it only transmits data on the TDM bus 16.

On the transmit side, the digital combiner 24 consists of a TDM dual port (DP) receiver 244, an inverse FFT 242, and a convolutional synthesis digital filter 240. In a manner that will be described below, the TDM DP receiver 244 reads each of the data samples off the TDM bus 16 in their assigned time slot and provides them to the inverse FFT 242 in the appropriate order. The samples are then operated on by the inverse FFT 242 and convolutional synthesis filter 240 to provide the composite digital signal 25.

Figure 3:
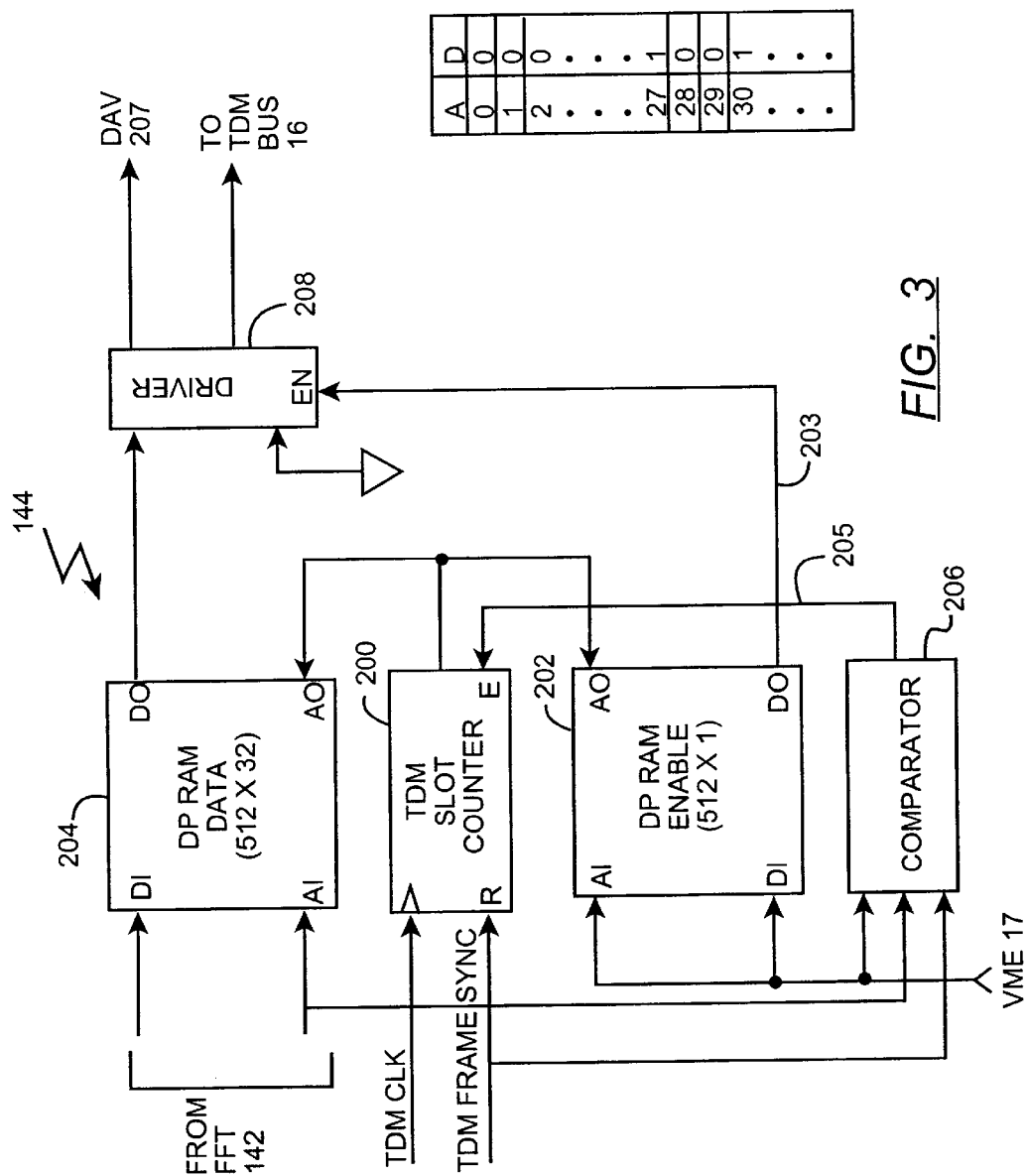
FIG. 3 is a detailed diagram of an addressable bus driver using a dual port random access memory (DP-RAM) used within a digital channelizer.

Returning attention now to the channelizer 14, a detailed diagram of the TDM DP driver 144 is shown in FIG. 3. Briefly, it operates to assert the output samples from the FFT 142 in the proper time slots on the TDM bus 16. In order to simplify the implementation of the TDM bus 16, these time slots can be fixedly assigned to particular channels (such as in ascending order by frequency and time slot number). Thus, a sample of a given one, k, of the N channel signals, will always appear in a particular time slot, k, when it is active.

The TDM DP driver 144 consists of a TDM slot counter 200, a first Dual Port Random Access Memory (DP-RAM) referred to as the enable DP-RAM 202, a second DP-RAM referred to as the data DP-RAM 204, and a driver 208 having an enable input EN.

As is conventional, each of the DP-RAMs have two separate address and data ports for reading and writing data, namely, input address and data ports A1 and D1, and output address and data ports A0 and D0.

In operation, the TDM slot counter 200 receives a pair of signals generated by the TDM synchronization circuit 32. The first signal, TDM CLK, is a digital clock signal identifying the clock periods, or time slots, on the TDM bus 16. The second signal is a TDM FRAME SYNC signal, indicating when a new frame starts on the TDM bus 16.

The TDM slot counter 200, which is a standard digital counter, receives the TDM FRAME SYNC signal at a reset input R, and the TDM CLK signal at a clock input (denoted by a chevron in the Figures). Thus, the TDM slot counter 200 continuously keeps track of which consecutively numbered slot on the TDM bus 16 is presently active.

As the TDM bus rate may not be at the same rate as the sample rate output of the FFT 142, a comparator 206 can be used to track when a full set of samples, that is samples from all RF channels, has been stored in the data DP-RAM 204. The comparator 206 monitors the input address A1 of the DP-RAM 204 to compare it to the address of the last RF channel sample to be written to that DP-RAM 204. When the last address appears prior to receipt of the TDM FRAME SYNC signal, the DP-RAM 204 contains a full set of data. The comparator 206 outputs a signal 205 that enables the TDM slot counter 200 to be operated thus supplying sample data to the TDM bus 16. If the last address has not been generated prior to the TDM FRAME SYNC signal, it disables the TDM slot counter 200 preventing sample data from the DP-RAM 204 for the entire TDM frame. To signal the DSPs 18-1 that data is or is not available, a data available signal (DAV) 207 can be asserted or not asserted.

The manner in which the signals are multiplexed onto the TDM bus 16 is changed depending upon the bandwidth of channels in the modulation scheme being supported. In particular, the number of time slots per frame on the TDM bus 16 is adjusted depending upon the bandwidth of the modulation of the air interface which is implemented.

Figure 4A:
FIGS. 4A and 4B are timing diagrams showing the frame length and number of time slots on the TDM bus for two different channel bandwidths.
Figure 4B:
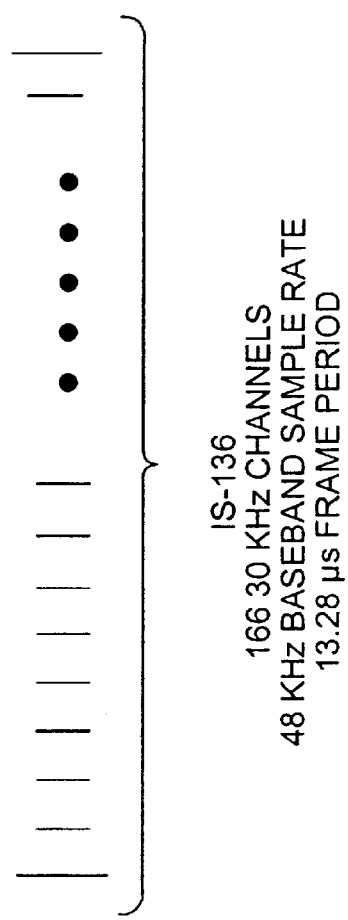

Thus, for different air interface standards, the TDM slot counter 200 may receive the TDM FRAME SYNC signal at different intervals, whereas the TDM CLK occurs at a constant rate. To provide a representative example, the TDM bus 16 operates at a constant rate, such as 25 MHz. The TDM FRAME SYNC signal interval is adjusted to the particular air interface standard to accommodate the associated RF channel baseband sample rate of the air interface. Turning attention briefly to FIGS. 4A and 4B, this concept will be better understood. As shown in FIG. 4A, for the GSM standard, the channelizer 14 provides 25 RF channels in the 5 MHz bandwidth of the broadband transceiver, each RF channel having a 200 kHz bandwidth. The complex-valued processing (e.g. in-phase and quadrature) sampling output from the FFT 142 is 320 kHz, determined by the 200 kHz spacing of the RF channels and the algorithm implemented by the digital channelizer 14. Thus, the TDM bus frame rate must occur at a period of no less than $\frac{1}{320}$ kHz or 3.125 µs.

However, the TDM bus clock is at a constant rate of 25 MHz with each clock interval marking a time slot on the TDM bus 16. To accommodate all of the 25 RF channels, the actual TDM FRAME SYNC signal period would be the number of RF channels divided by the TDM bus clock rate. However, the TDM bus 16 must accommodate transmit as well as receive channels; therefore, the TDM FRAME SYNC period is doubled. This results in an actual frame sync period of 2 µs, which is at a higher rate than required. Therefore, there will be frame periods for which no data is output to the TDM bus 16 and associated signaling by use of the DAV signal 207 described previously will not be asserted during these frames.

Accordingly, in order to support GSM channels, the TDM FRAME SYNC signal can be controlled by a TDM synchronization clock generator 32 to reset the TDM slot counter 200 every 2 µs, and the TDM CLK signal is set to clock the complex-valued samples, one from each of the 25 channels, during a given frame period 2 µs/(2×25); in other words, to provide a sample every 40 ns; however, at an average period of 3.125 µs/(2×25); in other words approximately 62.5 ns, given that not all frames possess valid sample data.

As shown in FIG. 4B, for the IS-136 TDMA standard, the channelizer 14 provides 166 channels, each having a 30 kHz bandwidth. The desired complex-valued sampling rate of each channel is approximately 48 kHz, so that the average frame period with valid sample data is 20.8333 µs, while the instantaneous frame period is 13.28 µs.

Accordingly, in order to support IS-136 channels, the TDM FRAME SYNC signal is controlled to reset the TDM slot counter 200 every 13.28 µs, and the TDM CLK signal is set to clock the complex-valued samples, one from each of the 166 channels, every 13.28 µs, and the TDM CLK signal is set to clock the complex-valued samples, one from each of the 166 channels, during a given frame period 13.28 µs/(2×166); in other words, to provide a sample every 40 ns; however, at an average period of 20.8333 µs/(2×166); in other words approximately 62.75 ns, given that not all frames possess valid sample data.

As shown in FIG. 1, the TDM synchronization clock generator 32 receives appropriate signals from the CPU 30 via the VME bus 17 indicating the desired TDM CLK and desired TDM FRAME SYNC rate.

The manner in which data may be asserted on the TDM bus 16 in any of the time slots will now be described in detail. In particular, the enable RAM 202 (FIG. 3) generates an enable signal 203 indicating when the TDM driver 144 may assert data on the TDM bus 16. The A1 and D1 inputs to the enable DP-RAM 202 are typically written into by the CPU 30 during the process of setting up a new call. In particular, as shown in the table depicting the contents of the enable DP-RAM 202, a location in the RAM is associated with each time slot on the TDM bus 16 (e.g., if the TDM bus contained 512 time slots, then the RAM 202 will have 512 locations).

A logical "0" in the associated enable DP-RAM 202 location indicates that the TDM driver 144 is inactive in the time slot that is, no data is to be asserted at that time. A logical "1" in the associated location indicates that the time slot has been assigned to this particular TDM driver 144.

Thus, to enable a connection through the TDM bus 16, one step for the CPU 30, via the VME bus 17, is to write a logical "1" into the DP-RAM 202 location "x" associated with the newly enabled digital channel signal "x". In the example shown in FIG. 3, a "1" has been written at locations "27" and "30", indicating that this particular TDM driver 144 is now active in timeslot numbers 27 and 30.

The data DP-RAM 204 acts as a buffer, writing the digital channel signal samples output by the FFT 142 at the D1 input of the data DP-RAM 204. The DP-RAM 204 then stores the data samples until addressed by the TDM slot counter 200 at the output side.

Figure 5:
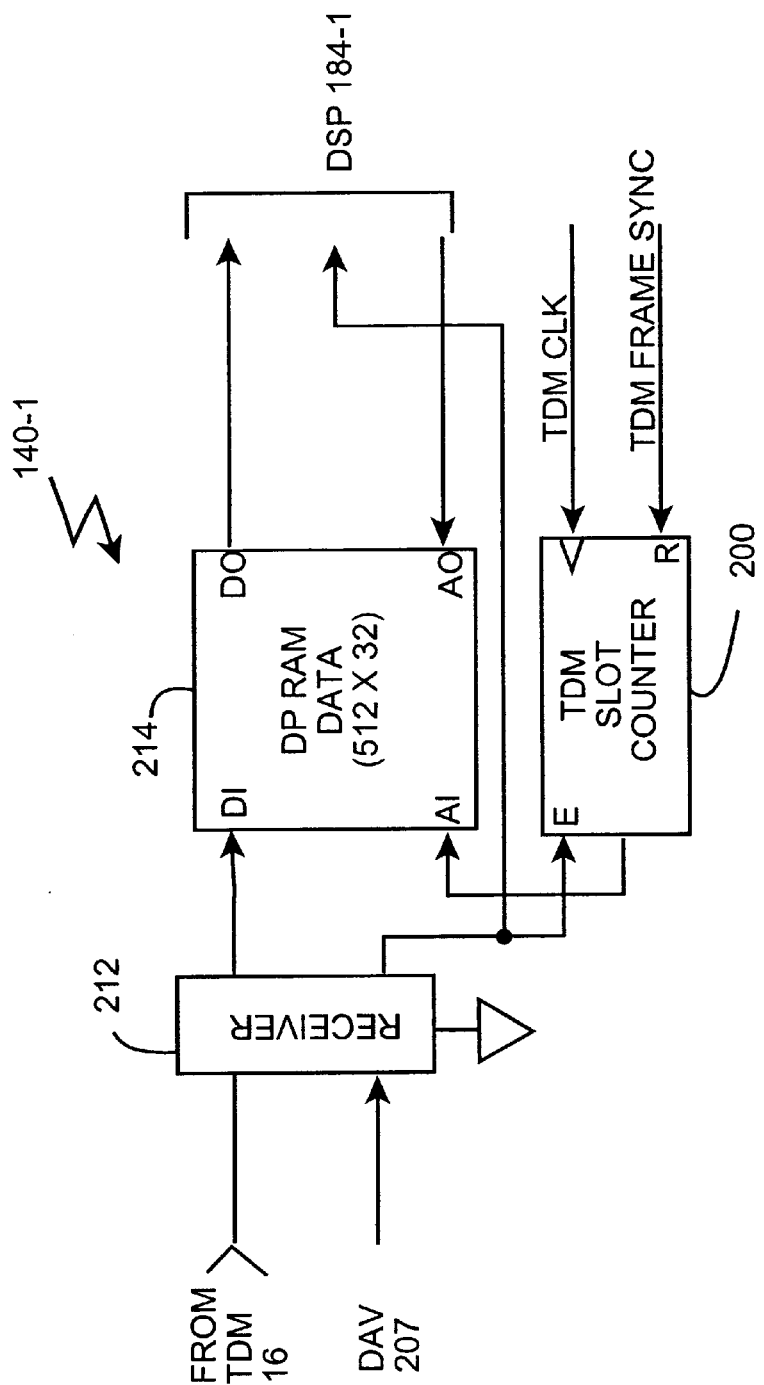
FIG. 5 is a detailed diagram of an addressable bus receiver using a dual port random access memory (DP-RAM) used with a DSP (Demodulator)

Similarly, the DSP 18-1 receives RF channel data from the TDM bus 16 using the DP-RAM architecture previously described. As shown in FIG. 5, channel data is received from the TDM bus 16 in a DP-RAM 214. The DAV signal 207 indicates the availability of valid data on the bus 16 and enables the TDM slot counter 200. This counter 200 can be initialized by the TDM FRAME SYNC signal and clocked by the TDM CLK. Sample is thereby written into the DP-RAM 214. However, unlike the TDM driver 144-1, an enable DP-RAM 202 is not necessary in the TDM receiver 140-2. Instead, the DSP 184-1 is directly configured by the CPU 30 via the VME bus 17 with the TDM bus slots that are provided valid data, i.e. locations in the DP-RAM 202 that contain sample data and reads that data from the DP-RAM 214 when signaled by the DAV signal 207 that data in the DP-RAM 214 is valid.

Figure 6:
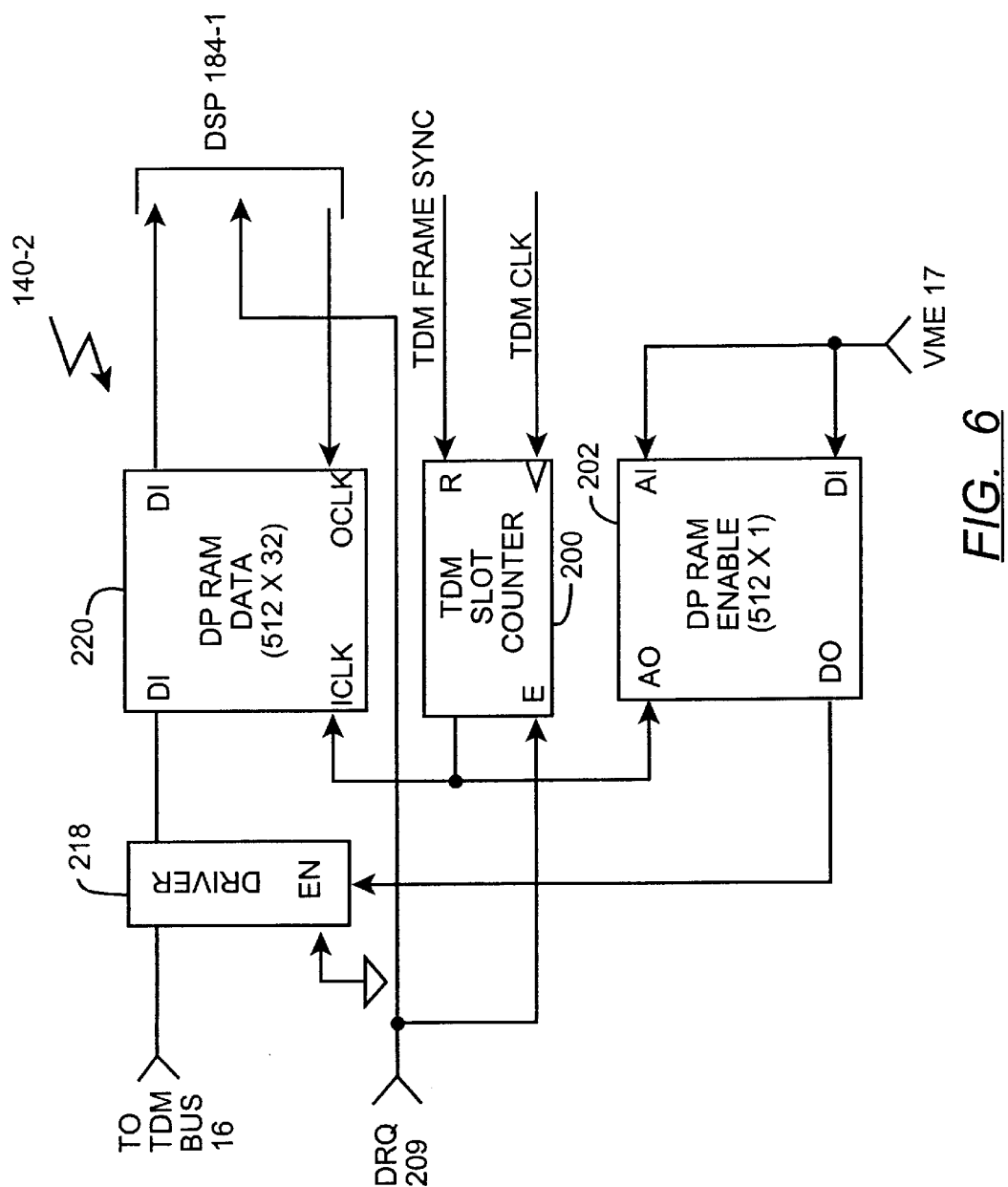
FIG. 6 is a detailed diagram of an addressable bus driver using a dual port random access memory (DP-RAM) used with a DSP (Modulator)

Moving to transfer sample data in the opposite direction, FIG. 6 details the TDM DP driver 180-2 of the DSP 140. The DSP processor 184-2 outputs data to the data DP-RAM 220. The DSP processor 184-2 is configured by the CPU 30 via the VME bus 17 with the active TDM bus time slots. The DSP processor 184-2 is signaled by the de-assertion of the data request (DRQ) 209 signal that the previous sample data in the data DP-RAM 220 has been output; therefore, the data DP-RAM 220 can receive new sample data. As the DSP processor 184-2 must maintain valid samples in the data DP-RAM 220 in anticipation of the next assertion of the DRQ signal 209, the DRQ signal 209 is asserted to command sample data to be output to the TDM bus 16. This enables the TDM slot counter 200 to address the DP-RAM 220 to output the data to the TDM bus 16. Likewise, the enable DP-RAM 202 is configured by the CPU 30 via the VME bus 17 with the time slots for which sample data will be output on the TDM bus 16. The TDM slot counter 200 addresses the enable DP-RAM 202 to enable the driver 218 to drive the sample data on the TDM bus 16 during enabled TDM time slots.

Figure 7:
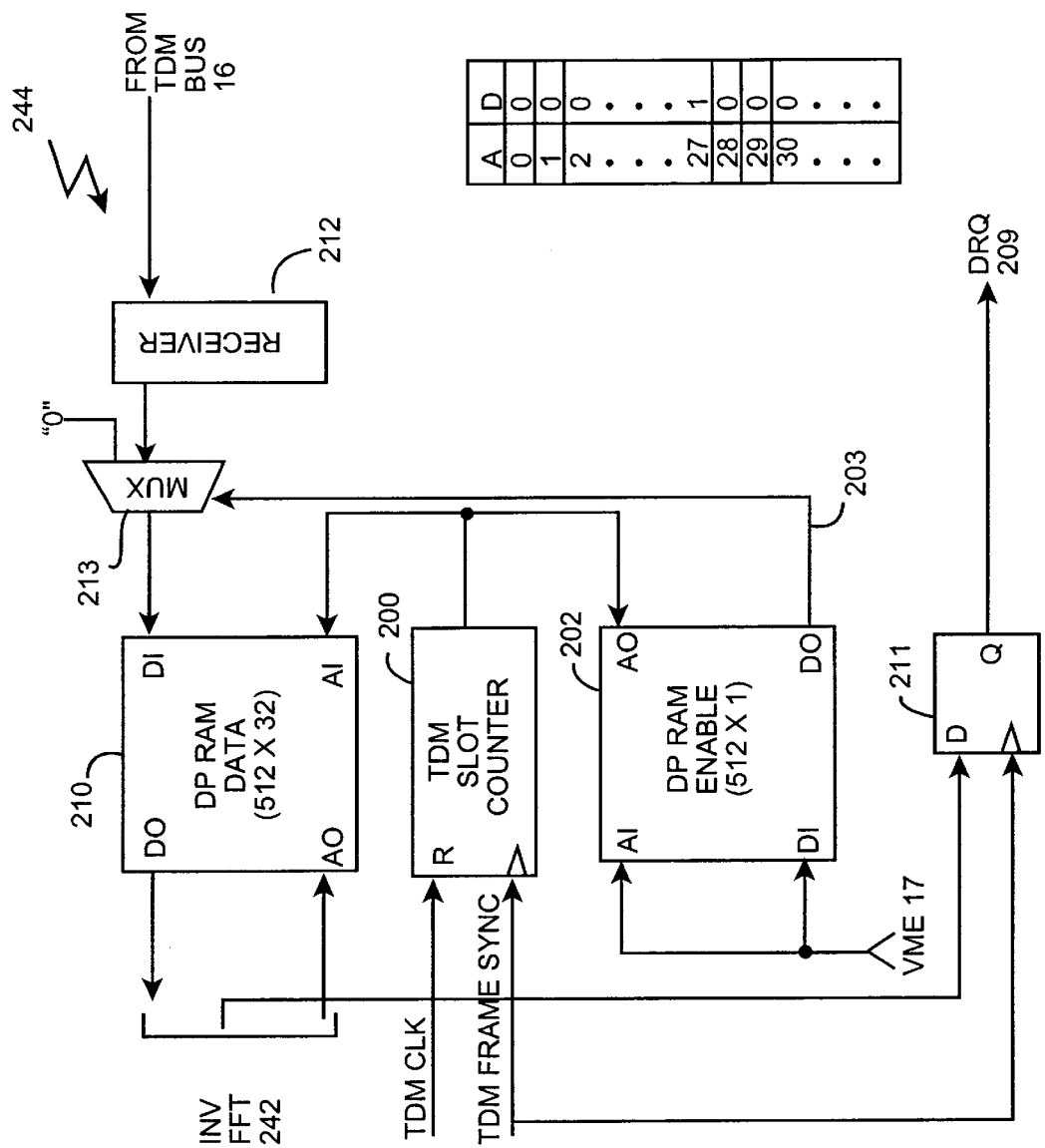
FIG. 7 is a detailed diagram of an addressable bus transmitter using a dual port random access memory (DP-RAM) used with a digital combiner.

The TDM DP receiver 244 is shown in detail in FIG. 7. As for each of the other receivers, it includes a TDM slot counter 200 and an enable DP-RAM 202. It includes a data DP-RAM 210 operating similarly to the data DP-RAM in the TDM DP receiver 214 (FIG. 5) and bus receiver 212. The inv FFT 242 is a signal indicating when it must input sample data. This signal is synchronized with the TDM bus 16 via the TDM FRAME SYNC signal to output the DRQ signal 209. This enables the DSP 140-2 to output sample data on the TDM bus 16 which is received into the data DP-RAM 210. With each TDM CLK, a sample is transferred to the TDM DP receiver 244 and stored in the DP-RAM 210, and the TDM slot counter 200 addresses a different location in the DP-RAM 210 for each sample corresponding to a channel to be transmitted. Likewise, the TDM slot counter 200 addresses the enable DP-RAM 202. However the output of the enable DP-RAM 202 selects if data for a particular channel is to receive data from a DSP 140-2 or no data, i.e. a zero sample, via a multiplexer 213. Similarly to the DP-RAM 202 of the TDM DP driver 144, the enabled channels are configured in the enable DP-RAM 202 of the TDM DP receiver 244 from the CPU 30 via the VME bus 17.

With this background in mind, frequency hopping can now be better understood. In essence, frequency hopping allows each of the mobile stations 40 to communicate with the basestation 10 on different frequencies, the transmission frequency of both the mobile station 40 and the basestation 10 changing between bursts of information. Bursts of information transmitted between the basestation 10 and mobile stations 40 typically have a framing format, embedded in the transmitted signal that synchronizes the timing of the basestation 10 with that of the mobile 40. Hereafter, this framing format shall be referred to as the air interface framing and associated timing as the air interface timing. This air interface timing allows the basestation 10 and mobile station 40 to hop frequencies synchronously as well as synchronize other functions necessary for the normal operation of the wireless telecommunications network. Additionally, the rate of the air interface timing is not necessarily multiples of the sample data rate of the input of the digital channelizer 14 or the output of the digital combiner 24 nor with the TDM bus clock rate described previously. As such, the embodied invention accommodates the differences in timing and clock rates to ensure proper operation of the frequency hopping function within the basestation 10.

As mentioned previously, TDMA air interface protocols time multiplex multiple traffic and control channels onto a single physical RF channel. These channels transmit during a predefined time slot on the RF channel, hereafter referred to as a burst slot to avoid confusion with the time slots of the TDM bus 16. As such, when frequency hopping, a mobile station 40 will generally maintain its same relative burst slot number when hopping to a different frequency. In a preferred embodiment, the mobile units 40 that are allocated different burst slots on the same carrier hop together whereby the allocations of one of the unique carrier frequencies changes from air interface frame to air interface frame according to a frequency hopping algorithm or schedule.

Figure 8:
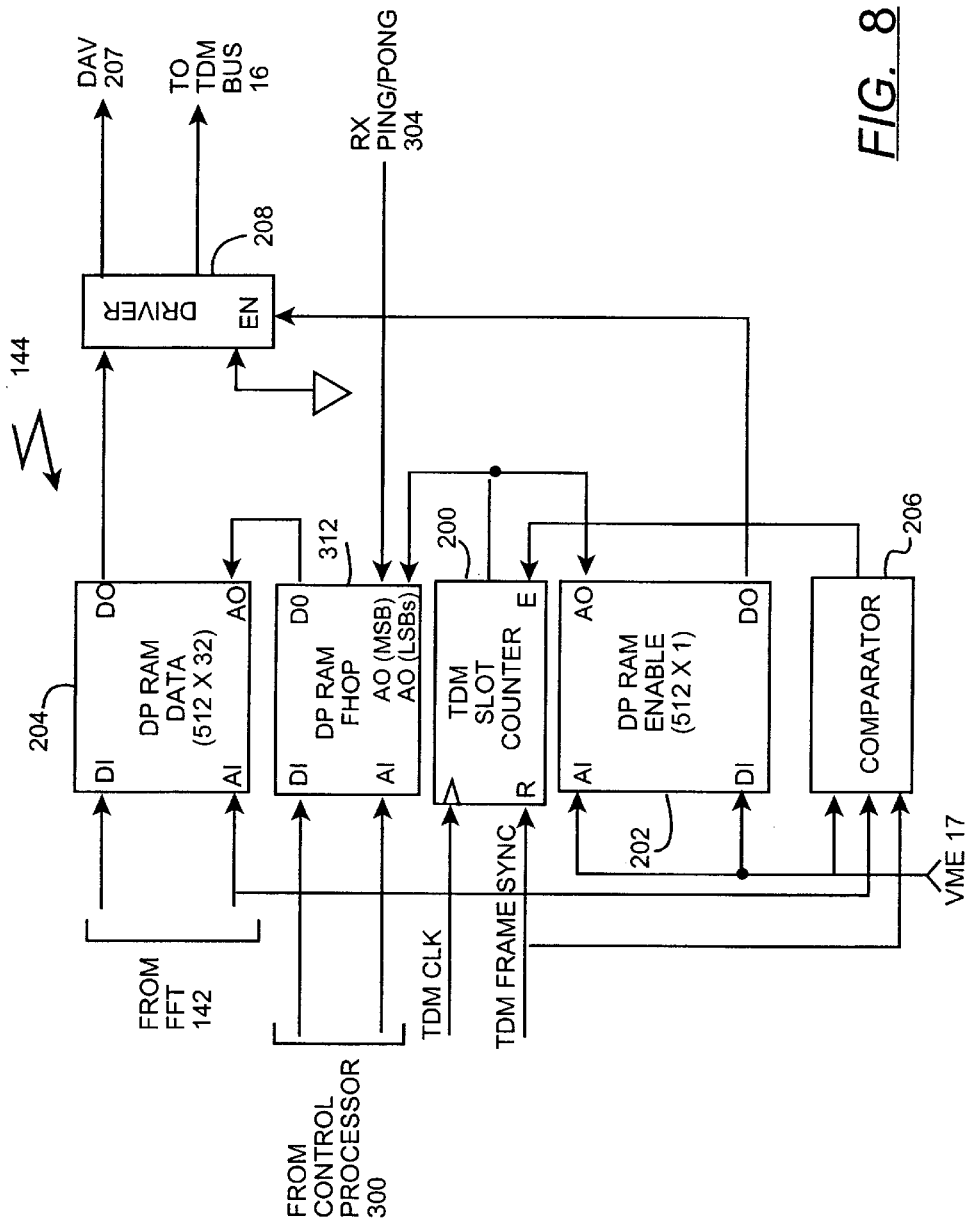
FIG. 8 diagrammatically illustrates the use of a frequency hop dual port random access memory (DP-RAM) according to the present invention within a digital channelizer.

Accordingly, general reference is now made to FIG. 8 whereby a FHOP DP-RAM 312 is incorporated into the TDM DP driver 144, whereas other components of the TDM DP driver 144, namely the data DP-RAM 204, TDM slot counter 200, enable DP-RAM 202, comparator 206, and driver 208 function similarly as previously described. However, the output of the TDM slot counter 200 addresses lower order significant bits (LSBs) of the output address of the FHOP DP-RAM 312. Additionally, the higher order address bit (MSB) of the FHOP DP-RAM 312 is driven by a Rx PING/PONG signal 304, for a purpose that will be made apparent shortly. Likewise, the output address of the data DP-RAM 204 is driven by the output data of the FHOP DP-RAM 312.

Furthermore, the FHOP DP-RAM 312 is configured by a control processor 300, with the current physical RF channel mapping from the digital channelizer 14 to the logical channel of the DSP demodulator 18-1 within a contiguous block of memory locations within the FHOP DP-RAM 312. Likewise, the next physical RF channel mapping in the frequency hop sequence is configured in another contiguous block of memory locations within the FHOP DP-RAM 312. Additionally, the current mapping and next mapping are stored such that respective mappings of each RF channel is offset in memory by the MSB address bit driven by a Rx PING/PONG signal 304. At the hop sequence interval, known to the control processor 300, the control processor 300 causes the Rx PING/PING 304 signal to toggle, effectively allowing the RF channels to hop from one RF frequency to the next. The physical signal of a mobile unit 40 is thereby remapped to the same logical channel through the TDM bus 16 although its physical RF channel has changed. Thus, the same DSP demodulator 18-2 performs the baseband processing of the signal from the mobile unit 40 before and after the change in RF frequencies.

Figure 9:
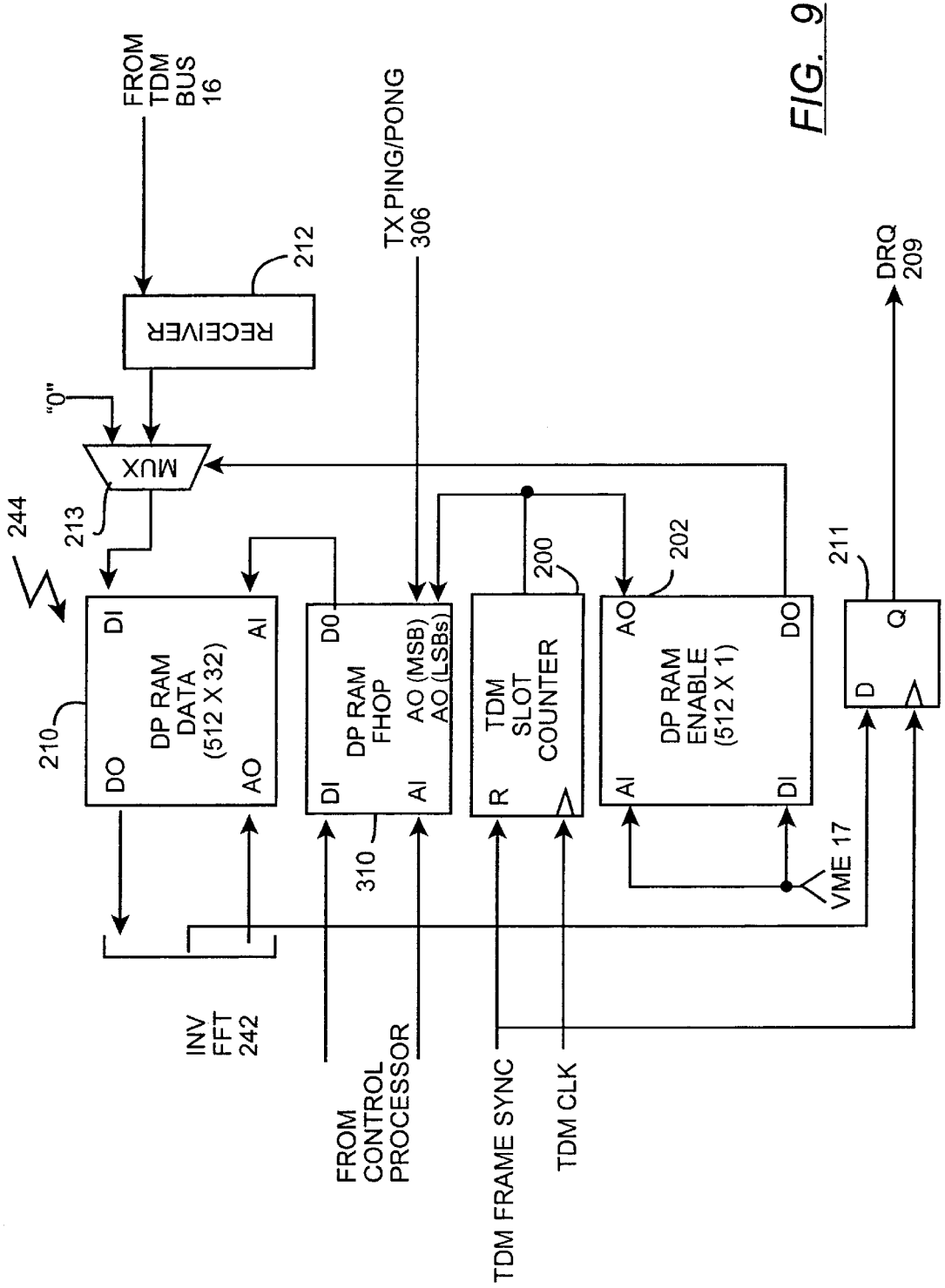
FIG. 9 diagrammatically illustrates the use of a frequency hop dual port random access memory (DP-RAM) according to the present invention within a digital combiner.

Similarly, the TDM DP receiver 244 also incorporates a FHOP DP-RAM 310 as depicted in FIG. 9. In a similar manner, the current and next channels are mapped between the DSP modulator 18-2 and the digital combiner 24. The hop of physical RF channels is effected by a Tx PING/PONG signal 306 driven by the control processor 300.

Figure 10:
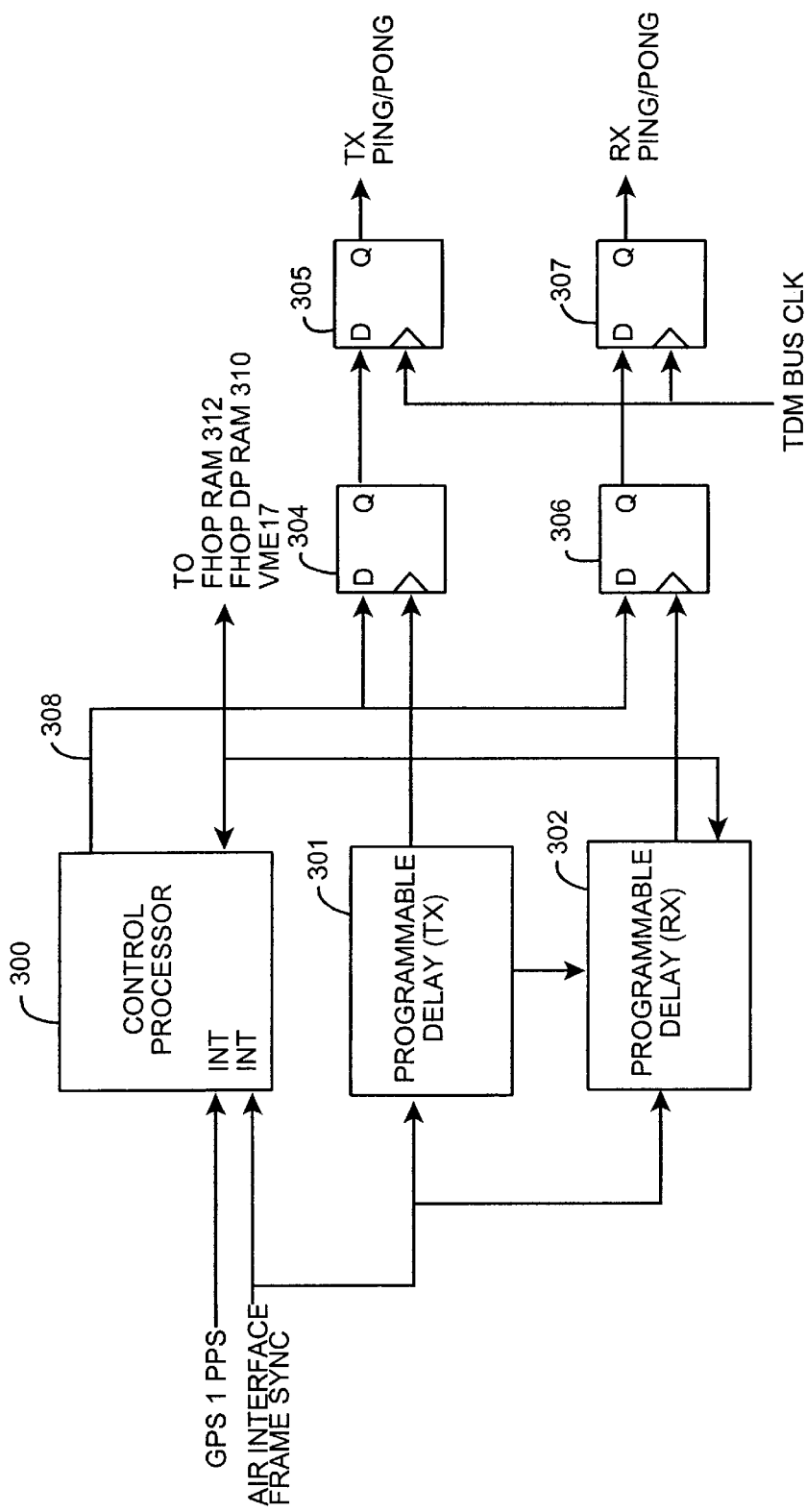
FIG. 10 diagrammatically illustrates a method for generation and synchronization of frequency hopping control signals.

As mentioned earlier, synchronization is maintained between the various rate of the air interface framing, which determines the hop sequence interval, the TDM bus framing, and the baseband sample rate of the digital channelizer 14 and digital combiner 24. To achieve this synchronization, a GPS receiver 36 (FIG. 1) drives the TDMA FRAME SYNC circuitry 35, generating the air interface framing. For the GSM air-interface, the air interface framing periodically aligns with a 1 pulse per second (PPS) signal from the GPS receiver 36. The CPU 30 reads the time from the GPS receiver 36 to determine when the next alignment will occur and configures the control processor 300 shown in FIG. 10 to synchronize it with the air interface framing. Knowing the air interface framing, the control processor 300 toggles a signal 308 at the hop sequence interval. This signal is qualified by the air interface framing via synchronizing components 304 and 306. Further qualification with the TDM bus clock via synchronizing components 305 and 307 occurs to ensure that the change to the mapping will not corrupt a data sample transmitted across the TDM bus 16. Particularly for GSM, the instant of the frequency hop of a receive signal (mobile unit 40 to basestation 10) is offset from the frequency hop from a transmit signal (basestation 10 to mobile unit 40). Programmable delays 301 and 302 can compensate this offset, as well as differences in the propagation delay in the transmit and receive paths.

Figure 11:
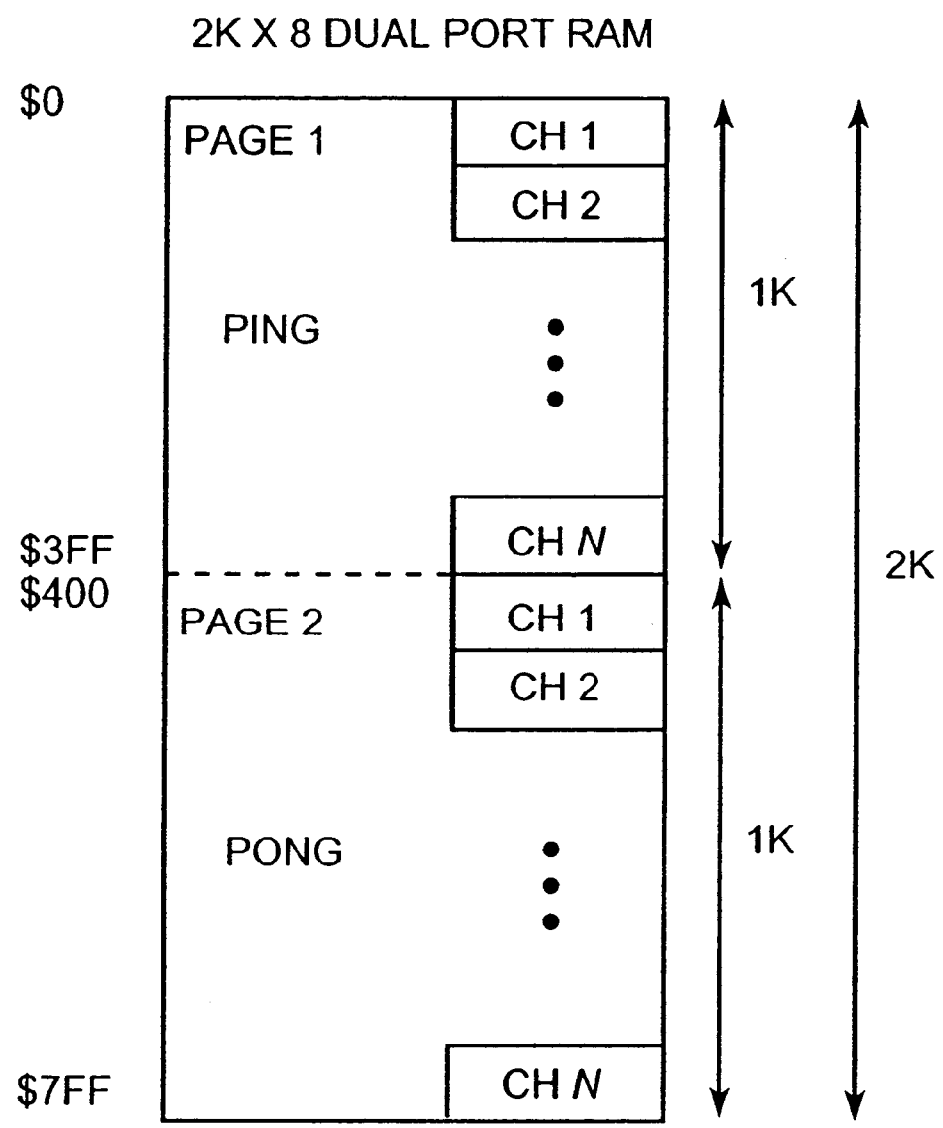
FIG. 11 diagrammatically illustrates the dual port random access memory (DP-RAM) partitioning.

To further clarify the mapping of the RF channels to logical channels, FIG. 11 illustrates the memory allocation of the FHOP DP-RAM 310 and 312. One block or page of memory holds the current mapping and the other page holds the next mapping. Each memory location on a given page holds the mapping for a logical channel. For example location $0 in the first page and location $400 in the second page may, respectively, represent the current and next mapping of the same logical channel to different physical RF channels. At the hop interval, the MSB of the DP-RAM is toggled such that second page holds the current mapping. Immediately after the hop and prior to the next hop, the control processor 300 writes the next mapping of the hop sequence into the first page, and the control processor 300 waits for the next air interface frame when the next hop is to be initiated.

The spirit of the present invention is not limited to any embodiment described above. Rather, the details and features of an exemplary embodiment were disclosed as required. Without departing from the scope of this invention, other modifications will therefore be apparent to those skilled in the art. Thus, it must be understood that the detailed description of the invention and drawings were intended as illustrative only, and not by way of limitation.

What is claimed is:

1. A basestation for processing signals from multiple mobile subscribers communicating on a plurality of different physical channels on any time division multiplexing scheme, said subscribers changing said physical channels upon which they communicate according to a predetermined and modifiable frequency hopping schedule characterized by a hopping period, said base-station comprising:

a broadband transceiver transmitting and receiving signals on said plurality of physical channels for receiving and producing an IF signal having multiple IF channels corresponding to said physical channels;

a digital channelizer receiving said IF signal from said broadband transceiver to produce a plurality of baseband outputs each providing a downconverted, modulated, baseband signal of one of said multiple IF channels;

a plurality of digital signal processing resources having inputs accepting said modulated baseband signals and having outputs producing a demodulated logical channel;

another plurality or the same plurality of digital signal processing resources having logical outputs to produce modulated baseband signals from received unmodulated logical channels and having inputs to receive said unmodulated channels;

a digital combiner having a plurality of baseband inputs each accepting an individual modulated baseband signal corresponding to a physical RF channel, upconverting and combining said baseband signals into a single composite IF signal to said broadband transceiver;

a channel allocator allocating ones of said baseband outputs of said digital channelizer to ones of said logical inputs of said digital signal processing resources and allocating ones of said baseband inputs of said digital combiner to logical outputs of said digital signal processors according to a mapping signal;

a physical to logical channel mapper providing said mapping signal to said channel allocator according to said predetermined and modifiable frequency hopping schedule, said frequency hopping schedule synchronizable to said physical channels on said any time division multiplexing scheme;

wherein frequency hopping can be accommodated using said broadband transceiver without retuning said broadband transceiver.

2. The basestation according to claim 1 wherein said channel allocator comprises a time division multiplexed (TDM) bus, wherein said TDM bus is remapped each said hopping period.

3. The basestation according to claim 1 wherein said channel allocator utilizes dynamic TDM mapping of said physical channels to said logical channels.

4. The basestation according to claim 3 wherein at least one dual port memory device stores current mapping signals and next mapping signals.

5. The basestation according to claim 4 further comprising at least one control processor, said processor operatively coupled to said dual port memory device to change said processors to simultaneously remap said physical channels to said logical channels.

6. The basestation according to claim 5 wherein at least one control processor is enabled to configure said dual port memory device with said current and said next mapping signals.

7. The basestation according to claim 6 wherein at least one new mapping signal is written to said dual port memory device to effect a desired frequency hopping sequence.

8. A basestation for processing signals from multiple mobile subscribers communicating on a plurality of different physical channels, said subscribers changing said physical channels upon which they communicate according to a predetermined frequency hopping schedule, said basestation comprising:

a broadband transceiver transmitting and receiving signals on said plurality of physical channels to receiving and producing an IF signal having multiple IF channels corresponding to said physical channels;

a digital channelizer receiving said IF signal from said broadband transceiver to produce a plurality of baseband outputs each providing a downconverted, modulated, baseband signal of one of said multiple IF channels;

a plurality of digital signal processing resources having inputs accepting said modulated baseband signals and having outputs producing a demodulated logical channel;

another plurality or the same plurality of digital signal processing resources having logical outputs to produce modulated baseband signals from received unmodulated logical channels and having inputs to receive said unmodulated channels;

a digital combiner having a plurality of baseband inputs each accepting an individual modulated baseband signal corresponding to a physical RF channel, upconverting and combining said baseband signals into a single composite IF signal to said broadband transceiver;

a channel allocator allocating ones of said baseband outputs of said digital channelizer to ones of said logical inputs of said digital signal processing resources and allocating ones of said baseband inputs of said digital combiner to logical outputs of said digital signal processors according to a mapping signal, wherein said channel allocator utilizes TDM mapping of said physical channels to said logical channels and wherein at least one dual port memory device stores current mapping signals and next mapping signals;

at least one control processor, said processor operatively coupled to said dual port memory device to change said processors to simultaneously remap said physical channels to said logical channels, said at least one control processor synchronized to a frequency hopping interval determined by the framing of an air interface communication between said basestation and said mobile units and a physical to logical channel mapper providing said mapping signal to said channel allocator according to said predetermined frequency hopping schedule;

whereby frequency hopping can be accommodated without retuning said transceiver.

9. The basestation according to claim 7 where said synchronization is effected by use of a GPS receiver.

10. The basestation according to claim 7 wherein at least one control processor is enabled to effect remapping of said physical channels to said logical channels synchronous to said frequency hopping interval.

11. The basestation according to claim 10 further comprising means for compensating for offset and propagation delay differences of said frequency hopping interval between transmit and receive channels.

12. The basestation according to claim 11 further comprising means for adjusting for time differences between framing of air interface signals, channel sampling of said digital channelizer and said digital combiner, and said TDM bus.

13. The basestation according to claim 10 further comprising at least one delay device, said device compensating for offset and propagation delay differences of said frequency hopping interval between transmit and receive channels.

14. The basestation according to claim 13 further comprising at least one synchronizing device, said device adjusting for time differences between framing of air interface signals, channel sampling of said digital channelizer and said digital combiner, and said TDM bus.

* * * * *